United States Patent
Pochwalski 4,205,231

May 27, 1980

[54] DEVICE FOR LIGHT FLUX ATTENUATION, ESPECIALLY FOR ADDITIONAL QUENCHING OF SCINTILLATIONS AT RADIONUCLIDE ACTIVITY DETERMINATION

[75] Inventor: Krzysztof K. Pochwalski, Warsaw, Poland

[73] Assignee: Instytut Badan Jadrowych, Warsaw, Poland

[21] Appl. No.: 950,312

[22] Filed: Oct. 10, 1978

[30] Foreign Application Priority Data

Oct. 12, 1977 [PL] Poland .................................. 201490

[51] Int. Cl.² .......................... G01T 1/20; G01T 1/00; G02B 9/00
[52] U.S. Cl. .................................... 250/364; 250/328; 250/368; 350/206
[58] Field of Search ................... 250/328, 361 R, 364, 250/368; 350/206

[56] References Cited

U.S. PATENT DOCUMENTS

| | | | |
|---|---|---|---|
| 3,809,897 | 5/1974 | Thomas et al. | 250/328 |
| 4,021,670 | 5/1977 | Noakes | 250/328 |

OTHER PUBLICATIONS

Flynn, K. F. et al., "Absolute Counting of Low Energy Beta Emitters Using Liquid Scintillation Counting Techniques", Argonne National Laboratory, Academic Press, Inc., New York and London, 1971, pp. 687-696.

*Primary Examiner*—Alfred E. Smith
*Assistant Examiner*—Janice A. Howell
*Attorney, Agent, or Firm*—Haseltine, Lake & Waters

[57] ABSTRACT

Apparatus for light flux attenuation particularly for additional quenching of scintillations in the determination of radionuclide activity comprising a body provided with a counting chamber containing a counting vial which is optically coupled with photomultipliers and between which is disposed a cylindrical spring. The opposite ends of the spring are secured in the body and the spring extends in surrounding relation with a rotatable bush mounted in the body. The bush is provided with a ring having a hole through which the cylindrical spring passes such that the ring divides the spring into a first portion surrounding the counting vial and a second portion surrounding the rotatable bush.

8 Claims, 1 Drawing Figure

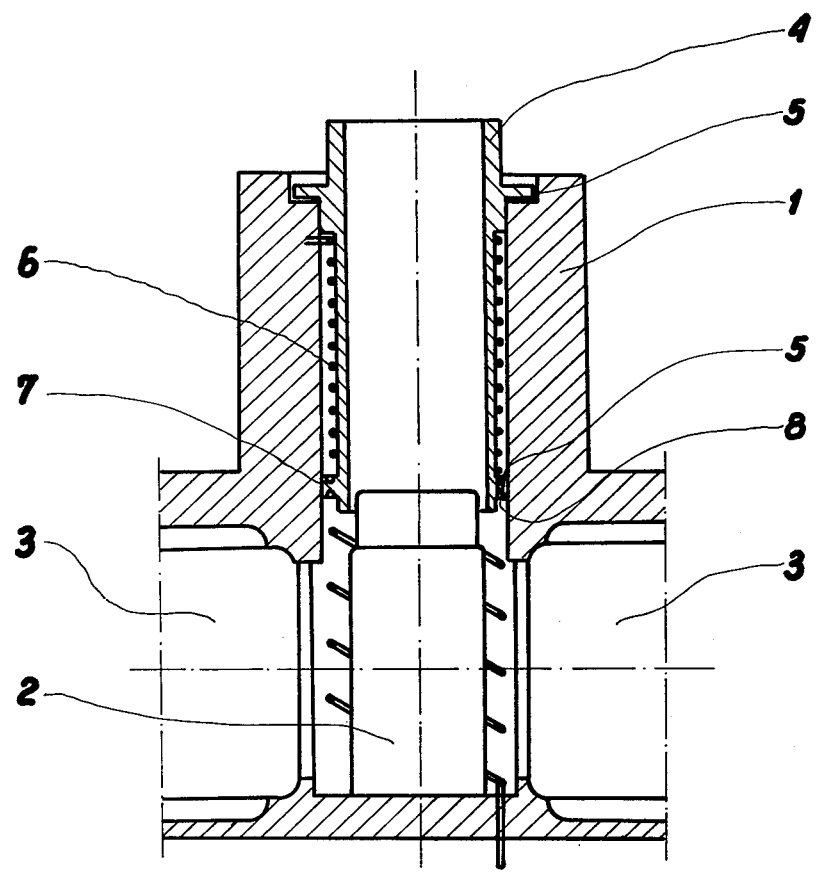

DEVICE FOR LIGHT FLUX ATTENUATION, ESPECIALLY FOR ADDITIONAL QUENCHING OF SCINTILLATIONS AT RADIONUCLIDE ACTIVITY DETERMINATION

FIELD OF THE INVENTION

The present invention relates to a device for light flux attenuation, especially for additional quenching of scintillations in the determination of radionuclide activity. The invention can also be used for the determination of the disintegration rate of radionuclides by liquid scintillation counting, for pure beta emitters with low maximum energy, such as $^3$H, $^{63}$Ni, $^{14}$C, $^{35}$S as well as for various optical instruments which require a mechanical optical diaphragm.

PRIOR ART

Known in the art are devices with mechanical diaphragms in the form of flat plates used in optical systems.

In the measurement of radionuclide activity by liquid scintillation counting, it is necessary to attenuate the light flux, but the known means are not suitable for this purpose (Flynn, Clendenind and Prodi "Organic Scintillators and Liquid Scintillation Counting" Academic Press, New York, 1971).

Up to now, devices without mechanical diaphragms have been used for the measurements of activity, wherein the quenching effect is obtained by adding a quenching substance to the scintillator solutions (A. Dyer "An Introduction to Liquid Scintillation Counting" Heyden, London, New York, 1974).

SUMMARY OF THE INVENTION

The device according to the invention comprises a counting chamber including a counting vial which is the light source coupled optically with photomultiplier tubes which are light detectors. Between the counting vial and the photomultuplier tubes there is a cylindrical spring acting as an adjustable light diaphragm, which is fastened at the top and bottom to the body of the device and passes through the hole of a ring in a rotary bush so that rotation of the bush produces a variation of the density of the spring coils.

The device according to the invention makes it possible to obtain in a non-destructive way, scintillation quenching curves for a source of any rationuclide measured by liquid scintillation counting, thus eliminating the necessity of obtaining the quenching curves by means of a quenching medium or with the use of expensive quenched standard source sets.

BRIEF DESCRIPTION OF THE DRAWINGS

The invention is illustrated in an exemplary embodiment shown in the drawing in which the sole FIGURE is an axial section of a device for scintillation quenching

DETAILED DESCRIPTION

The scintillation quenching device shown in the drawing comprises a body 1 forming a counting chamber which contains a counting vial 2 optically coupled with photomultiplier tubes 3 and provided with a rotatable bush 4 rotating on bearing 5. Between counting vial 2 and photomultiplier tubes 3 is a cylindrical spring 6 which is secured around counting vial 2 and rotative bush 4.

The operation of the device is as follows:

Rotation of the rotative bush 4 by the use of a transmission enables increase at will of the density of the spring turns around the counting vial 2 and reduction of the spring around the rotative bush 4, and vice versa. This permits a variation of light flux attenuation between the counting vial 2 containing a solution of radioactive substance in a scintillator and photomultiplier tubes 3. The spring turns may be fully withdrawn from the counting chamber, thus reducing the initial light attenuation caused by the spring to a practically negligible value.

What is claimed is:

1. Apparatus for light flux attenuation for additional quenching of scintillations in the determination of radionuclide activity, said apparatus comprising a counting chamber, a counting vial in said chamber serving as a light source, photomultiplier tubes optically coupled with said counting vial in spaced relation therewith to serve as light detectors, a coil spring including coils disposed between said counting vial and photomultiplier tubes and means for adjusting the spacing between said coils to serve as an adjustable light diaphragm.

2. Apparatus as claimed in claim 1 wherein said coil spring is cylindrical.

3. Apparatus as claimed in claim 1 wherein said means for adjusting the spacing between the coils comprises a rotatable member.

4. Apparatus as claimed in claim 3 further comprising a body, said rotatable member comprising a rotatable bush rotatably mounted in said body, said spring having opposite ends secured to said body, said bush having a hole through which said spring passes.

5. Apparatus as claimed in claim 4 wherein said spring has first and second portions located on opposite sides of the hole in the bush such that turning of the bush causes the density of the coils in one of said portions to increase while the density of the coils in the other portion decreases.

6. Apparatus as claimed in claim 5 wherein said bush includes a ring portion with said hole through which the spring passes.

7. Apparatus as claimed in claim 6 wherein said spring is oriented vertically and the opposite ends of the spring which are secured are its upper and lower ends.

8. Apparatus as claimed in claim 6 wherein said second portion of the spring encircles the counting vial while the first portion encircles the bush.

* * * * *